United States Patent
Peters et al.

[11] Patent Number: 5,427,142
[45] Date of Patent: Jun. 27, 1995

[54] VALVE DEVICE FOR USE IN ELECTRO-HYDRAULIC CONTROL SYSTEMS OF MINING INSTALLATIONS

[75] Inventors: Bernd Peters, Dulmen; Michael Dettmers, Kamen, both of Germany

[73] Assignee: Westfalia Becorit Industrietechnik GmbH, Germany

[21] Appl. No.: 100,732

[22] Filed: Aug. 2, 1993

[30] Foreign Application Priority Data

Aug. 29, 1992 [DE] Germany .............. 92 11 629.9

[51] Int. Cl.⁶ .................. F15B 13/02; F16K 11/00
[52] U.S. Cl. ........................... 137/596.17; 137/870
[58] Field of Search ................... 137/596.17, 870

[56] References Cited

U.S. PATENT DOCUMENTS

| | | | |
|---|---|---|---|
| Re. 34,261 | 5/1993 | Sule | 137/870 X |
| 3,884,266 | 5/1975 | Kondo | 137/625.27 |
| 4,907,779 | 3/1990 | Dettmers | 251/129.2 X |
| 5,092,365 | 3/1992 | Neff . | |

FOREIGN PATENT DOCUMENTS

| | | | |
|---|---|---|---|
| 2951232 | 7/1981 | Germany | 137/596.17 |
| 3620242A1 | 12/1987 | Germany . | |
| 2121516 | 12/1983 | United Kingdom | 137/596.17 |
| 2226110 | 6/1990 | United Kingdom . | |

Primary Examiner—Gerald A. Michalsky
Attorney, Agent, or Firm—Samuels, Gauthier & Stevens

[57] ABSTRACT

A valve device for use in an electro-hydraulic mining control system employs a cuboidal housing composed of two separate sub-housings. One sub-housing block has bores containing valve assemblies with cartridges which can be inserted into or withdrawn from the bores via an exterior face. Each cartridge is made up of two elongate sleeve components in screw-threaded engagement. The sleeve components define valve seatings and closure elements are guided in the components and engage on the seatings. A rod couples the closure elements so that when one closure element is on its seating the other is off its seating and vice versa. The closure elements are biased with a spring contained in a bushing fitted into the bore via the exterior face. The bushing is used to rotate the sleeve components relative to one another to adjust the relative position of the valve seatings. At the end of the cartridges remote from the exterior face the other sub-housing plate supports pivotable levers moved by electro-magnetic power to displace the valve closure elements against the spring force. The sub-housing block has internal bores acting as hydraulic connections for the valves and these bores all lead to openings in the same exterior face.

20 Claims, 2 Drawing Sheets

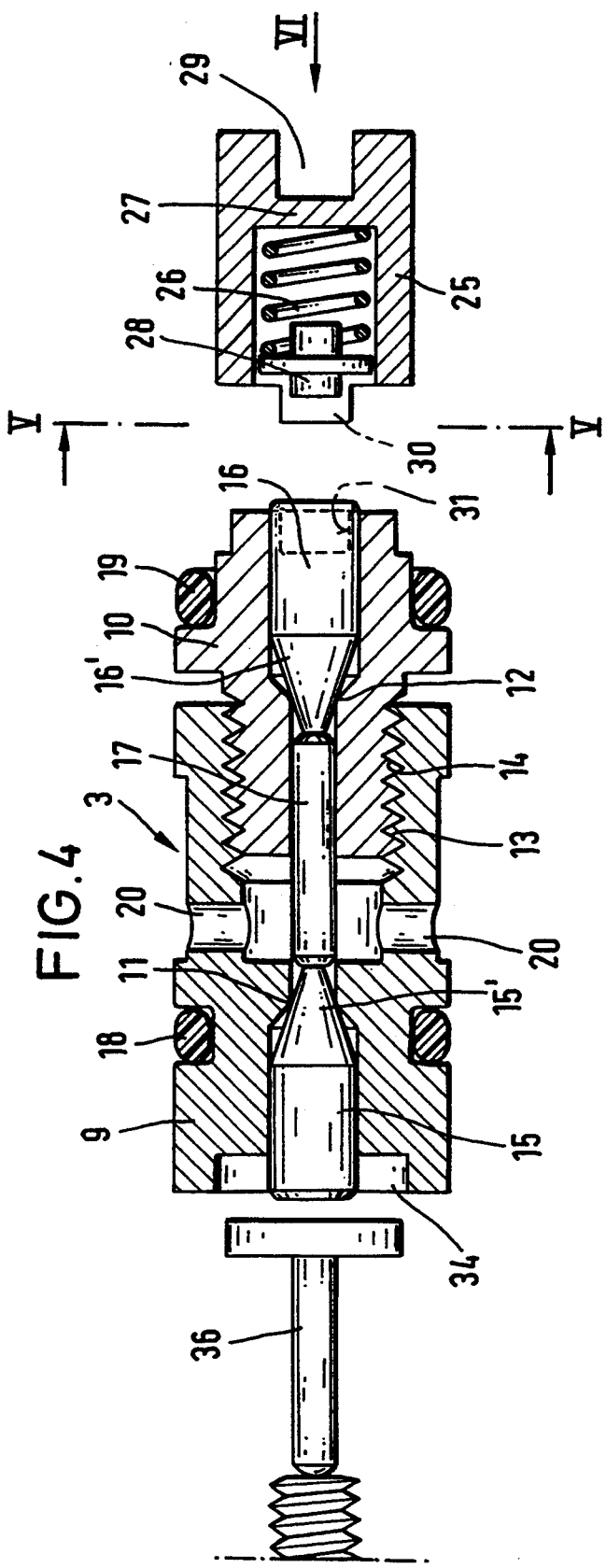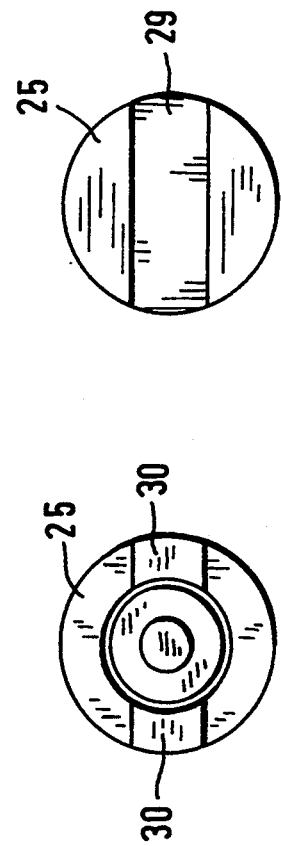

VALVE DEVICE FOR USE IN ELECTRO-HYDRAULIC CONTROL SYSTEMS OF MINING INSTALLATIONS

FIELD OF THE INVENTION

The present invention relates to valve devices for use in control systems, particularly electro-hydraulic control systems, of mineral mining installations.

BACKGROUND TO THE INVENTION

Electromagnetically actuated pilot valves are used in high pressure hydraulics, in particular in mining and, more specifically, in electro-hydraulic support control systems. They are used for switching subsidiary main valves by means of which apparatus, for example, hydraulic rams and props are actuated. The pilot valves designed as multi-path valves are switched with low switching forces and extremely small switching paths owing to the leverage of the associated switch levers.

The known pilot valves, may be embodied in devices of the type described, for example, in GB-A-2226110 and DE-PS 36 20 242. Such devices have, in the housing bores of a cuboid housing, valve inserts which contain the functional parts of the valves such as, in particular, the closure elements e.g., valve balls, valve seating members, coupling rods and valve springs together with guide parts receiving these other parts. The valves are usually actuated by electro-magnetic force exerted on levers which pivot through a small path of movement. For adjusting the switching action, the levers are often provided with adjusting screws against which a tappet or ram acting on the valve closure elements and guided in the valve insert rests.

Known valve devices employ valve inserts with a relatively large number of functional parts and they therefore demand relatively high production costs and also have relatively large dimensions. The reliability of operation is not always dependably ensured under the conditions of underground mining. Adjustment of the switching path by means of the adjusting screws arranged on the switch levers is frequently insufficiently precise for exact adjustment of the pilot valves. In particular, exact valve seating adjustments cannot be achieved. It should be taken into consideration that, with the necessary extremely small dimensions of the pilot valves and the extremely small switch paths which are about 0.1 mm or much lower owing to the leverage, accurate valve seating adjustment may only be achieved with difficulty.

An object of the invention is to provide an improved valve device with which sensitive valve seating adjustment may be achieved with the possibility of after-adjustment, wherein a simplified overall design of the device and a compact construction thereof are to be achieved if at all possible.

SUMMARY OF THE INVENTION

According to the invention there is provided a valve device for use in a control system for a mineral mining installation; said device comprising a housing, at least one bore within the housing containing a valve assembly having two valve closure elements which engage on seatings to form separate valves, passage means within the housing for establishing hydraulic connection with the valves and an electromagnetically operated actuator for displacing the valve closure elements so that one valve opens whilst the other valve closes; wherein the assembly has a cartridge defining the valve seatings which can be positionally adjusted and adjustment means is provided for adjusting the position of valve seatings said adjustment means being accessible from an exterior face of the housing remote from the actuator.

Preferably the cartridge is composed of two co-axial members disposed end-to-end along the bore the members being in screw-threaded engagement and the adjustment means serves to effective relative rotation between the members.

The above-mentioned object is achieved according to the invention in that for adjusting the valve seating spacing the two valve seating defining members may be set relative to one another by adjustments effected from the exterior of the housing remote from the actuator or switch lever.

The valve device according to the invention is consequently designed such that the axial spacing between the two valve seatings may be sensitively set when it is installed. This may be carried out without difficulty from the exterior side of the housing remote from the actuator side, that is without obstructing or dismantling the switch lever unit. The possibility of valve seating adjustments allows, in particular in conjunction with preliminary adjustment of the switching path by means of an adjusting screw arranged on the switch lever, exact setting of the valves which also leads to improved reliability in operation.

Conveniently, the cartridge is insertable into and removable from the reception bore via the exterior face of the housing and one or more seals serve to engage between the bore and the cartridge. This allows simple installation and exchange of the valve cartridge or insert. The housing bore may be of uniform diameter from the actuator side at least into the vicinity of the opposite external face of the housing. The bore may however be widened in diameter in the region of the external housing face of the housing.

In a preferred embodiment one valve seating member of the cartridge is screwed with an external thread into the threaded bore of the other valve seating member. The valve seating members are also provided with axially aligned bores which receive and guide the valve closure elements and a coupling rod or ram disposed between the closure members. The cartridge is preferably secured in the housing bore without screwing so it is not necessary to provide a thread on the housing bore and a corresponding thread on the two valve seating members.

It is also advisable to use, for the valve closure elements, cylindrical components such as valve pins or needles which are provided with frusto-conical tips and lead in the bores of the valve seating members. The use of such closure elements instead of valve balls helps to reduce the dimensions of the device.

According to a further advantageous design feature the adjustment means is a rotatable component also accessible from the exterior face of the housing. The valve seating member remote from the actuator can then be rotationally connected to the component at its external end for valve seating setting. The rotatable component may consist of a simple bushing which also fits in the housing bore. Preferably the bushing also accommodates a valve spring which acts on one of the closure elements and has a tool receptor or attachment, for example an engagement groove, a slot or the like at its external end. The bushing is also preferably designed as a push-in part which may be pushed into the housing bore. The bushing and the associated adjacent valve seating member with which it is engaged may be provided with axial projections and recesses which produce the rotational engagement.

The bushing may be fixed in the housing bore by means of an O-ring and a releasable closure ring which may be introduced into the housing bore so that the valve cartridge is likewise secured in the housing bore. It is also advisable to fix, in a rotationally engaged but axially releasable manner, the valve seating member of the valve insert or of the valve cartridge located on the actuator side to ensure that this internal valve seating member does not rotate during setting of the valve seating member nearest the external face. The rotationally engaged push-in connection used for this purpose may be designed in the manner of a simple tongue and groove joint.

The housing can be composed of a first sub-housing provided with the exterior face and the bore and another sub-housing detachably fixed to the first sub-housing and having a cavity accommodating the actuator. In a preferred embodiment there are two identically designed valve inserts or cartridges each actuated by its own actuator disposed in parallel housing bores. The other sub-housing may be a smaller flat plate which forms a carrier for the switch levers or actuators and can at the same time form the stop limit for the or each valve insert or valve cartridge.

It will be appreciated that, as usual, the housing is provided with the necessary passages or bores which produce the hydraulic connection to the high pressure line, the return line and the consumer(s) or other hydraulic controls. The device is preferably arranged such that all these bores open at the same external face of the housing remote from the actuator so that the hydraulic connections are also establishing at this location. The valve seating members and the coupling rod are preferably provided with axial flattened regions or axial grooves or the like which form the hydraulic internal connections. A return connection which is formed by a recess in the other sub-housing adjacent the first housing may be connected to a bore in the first housing leading to the hydraulic return.

The invention may be understood more readily, and various other aspects and features of the invention may become apparent, from consideration of the following description.

BRIEF DESCRIPTION OF DRAWINGS

An embodiment of the invention will now be described, by way of example only, with reference to the accompanying drawings, wherein:

FIG. 4 is a sectional exploded side view of a valve assembly usable in the device shown in FIGS. 1 to 3;

FIG. 5 is a view of part of the assembly taken along the line V—V of FIG. 4, and FIG. 6 is a view of the assembly part represented in FIG. 5 and taken in the direction of arrow VI in FIG. 4.

DESCRIPTION OF PREFERRED EMBODIMENT

Figure 2:
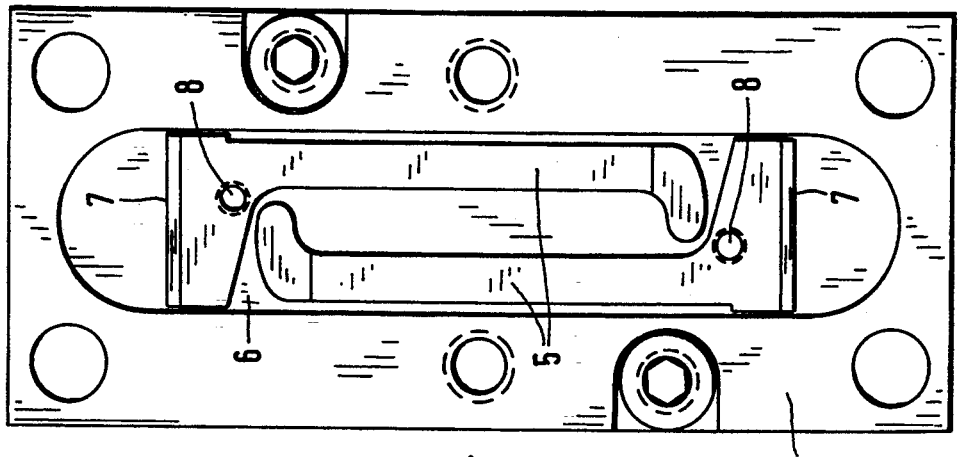
FIG. 2 is a view of one exterior face of the device taken in the direction of arrow II in FIG. 1.

As shown in the drawings, a valve device constructed in accordance with the invention is composed of a multi-part cuboidal or block like metal housing which may itself form part of a larger valve block. The housing is composed of a first major cuboid sub-housing 1 which possesses two parallel through bores 2. In each bore 2 there is a valve assembly including a cartridge or insert 3. The valve assemblies in the bores 2 are of identical construction. A second minor cuboidal sub-housing 4 is detachably fixed to the sub-housing 1, for example with the aid of screws. The housing 4 has a cavity 6 in one external face in which valve actuators in the form of operating levers 5 are disposed. The levers 5 are supported on opposed pivot joints 7 and each lever 5 carries a small adjustable grub screw 8 in a threaded bore near the associated pivot joint 7.

The valve assemblies take the form of multi-part double pilot valves operated with the aid of tappets displaced by the levers 5. The levers 5 are in turn themselves actuated by electro-magnetic switches (not shown) which employ armatures which can be displaced to press on the free ends of the levers 5. Each valve assembly employs two valve closure elements which are linked with a coupling rod to open and close in alternation against respective valve seatings.

FIGS. 4 to 6 depict one of the valve assemblies in more detail. As shown in FIGS. 4 to 6, the cartridge 3 of the assembly is composed of two complementary cylindrical members 9, 10 connected to one another with screw threads 13, 14. The members 9, 10 are provided with through bores which define the respective valve seatings 11, 12 which are associated with the valve closure elements 15, 16. The member 9 is of hollow tubular form with an internal screw thread 13 while the member 10 is of a plug-like form with an external screw thread 14 mating with the screw thread 13. The axial distance between the seatings 11, 12 defined by the members 9, 10 can thus be adjusted by relative rotation between the members 9, 10. The members 9, 10 have co-axial stepped bores with larger regions receiving the closure elements 15, 16. The coupling rod 17 is disposed between the elements 15, 16 and is guided within a narrow bore section in the member 10. The elements 15, 16 take the form of cylindrical components slidably guided within the larger diameter bore sections within the members 9, 10 and the elements 15, 16 have frusto-conical end regions 15', 16' sealably engageable with the seatings 11, 12. The elements 15, 16 and the coupling rod 17 can easily be installed into the members 9, 10. The members 9, 10 with the elements 15, 16 and the coupling rod 17 then collectively form the cartridge 3 introduced in to the associated bore 2 in the housing 1 from an external face 23 thereof remote from the housing 4. The cartridges 3 are sealed into the bores 2 with the aid of O-rings 18, 19 held in grooves in the exteriors of the members 9, 10. As shown in FIG. 4, the member 9 has radial bores 20 which lead to the exterior of the member 9 and provide hydraulic connection with a consumer appliance or with some other valve in an hydraulic circuit following the pilot valves. Within the valve inserts 3 hydraulic connections are provided by providing the valve closure elements 15, 16 and the coupling rod 17 with axially extended flat regions or grooves at their external cylindrical faces. This is not shown specifically in the drawings.

As also shown in FIG. 4, the valve assembly also employs a tappet 36 in contact with the grub screw 8 of the associated lever 5 at one end of the cartridge 3. At the opposite end of the cartridge 3 there is a bushing 25 containing a spring 26 which acts on a pressure plate 28 to transmit the spring force to the valve closure element 16. The spring 26 maintains the valve 16', 12 closed and the valve 15', 11 open while operation of the associated lever 5 displaces the tappet 36 to push on the closure element 15 to close the valve 15' 11 and open the valve 16', 12.

Figure 1:
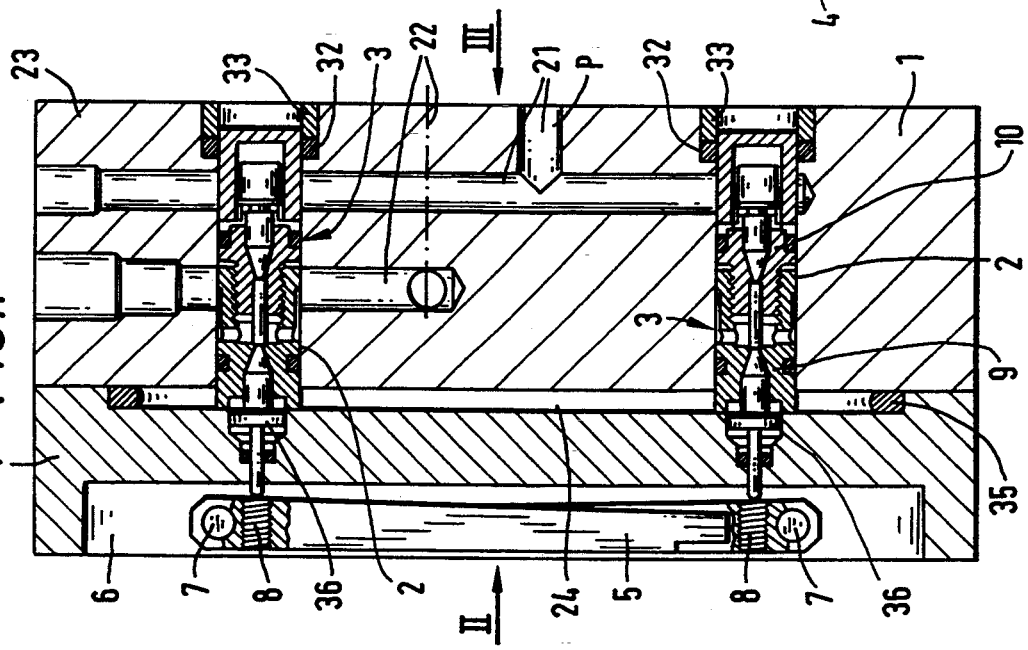
FIG. 1 is a sectional side view of a valve device constructed in accordance with the invention.
Figure 3:
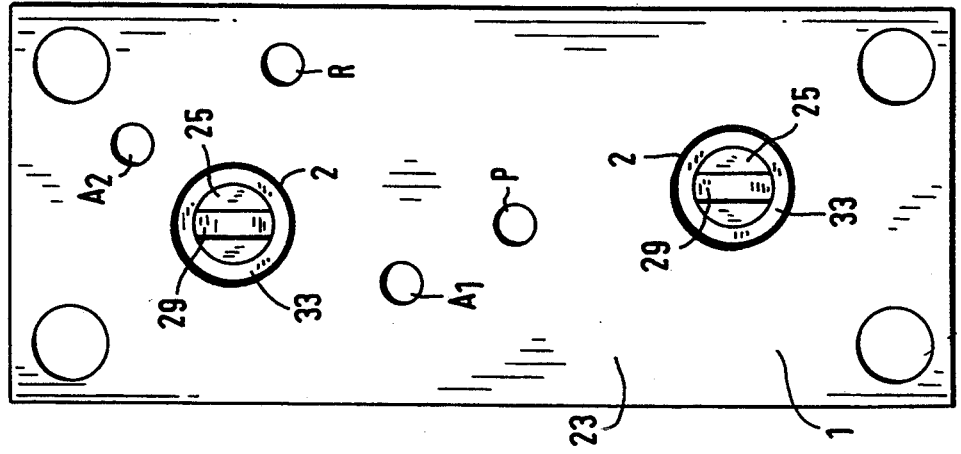
FIG. 3 is a view of another exterior face of the device taken in the direction of arrow III in FIG. 1.

As shown in FIGS. 1 and 3, the housing 1 is provided with separate groups of passages or bores 21, 22 which provide hydraulic connection to the pilot valves of the assemblies within the bores 2 in the housing 1. The inlet bores 21 are connected to a common opening or port P in the external face 23 of the housing 1 remote from the housing 4 and this opening P is connectable to an hydraulic pressure line. The outlet bores 22 communicate with the radial bores 20 in the valve cartridges 3 and also with further openings or ports A1, A2 at the external face 23 connectable to the consumer or another valve. The housing 4 has on its face adjacent the housing 1 a recess 24 which leads through a bore (not shown in FIG. 1) back to an opening R in the external face 23 of the housing 1 connectable to an hydraulic return line. The recess 24 is sealed with the aid of a seal 35 engaging between the housings 1, 4. All the hydraulic connections A1, A2, P, R necessary for the valve device to perform its functions are therefore located at the free external face 23 of the housing 1 remote from the valve actuators 5, 8.

The two housing bores 2, also penetrate the external face 23 of the housing 1 to permit the valve inserts 3 to be pushed into the bores 2 from the external face 23 and the cartridges 3 can then become sealed into the bores 2 means of the O-rings 18, 19. To enable the spacing between the seatings 11, 12 of each valve assembly to be adjusted sensitively from the exterior face 23 of the housing 1 the bushing 25 acts as an adjustor and can be rotated to rotate the member 10 relative to the member 9. The bushing 25 also fits into the bore 2 and the valve spring 26, which is relatively weak, rests upon a wall 27 of the bushing 25 and reacts through the pressure plate 28 to hold the valve element 16 against its seating 12. The other valve element 15 is then lifted from its seating 11 with the aid of the coupling rod 17.

If the valve closure element 15 of one of the valve assemblies is pressed against its seating 11 to establish the closure position of the pilot valve (15', 11) by means of the lever 5 and the tappet 36, the valve closure element 16 is simultaneously displaced away from its seating 12 by the coupling rod 17 thus opening the pilot valve (16',12) and producing hydraulic connection between the bores 20, 22 leading to the respective associated connection A1, A2 and the bores 21 which are connected to the pressure line P. Hydraulic pressure fluid can hence flow via the bores 21 and the internal channels of the pilot valve formed by the flattened regions via the radial bores 20 and the bores 22 to the consumer or following hydraulic control circuit. The hydraulic pressure produced via the bores 21 simultaneously acts in the closing direction of the valve (16'12). When the valves are switched over by release of the lever 5 the converse applies and the valve closure element 16 is held closed while the element 15 is opened and hydraulic connection is now established between the consumer or the control circuit and the return line R. The actual mode of operation of the pilot valves and the flow of pressure fluid and the utilisation of the same is well known and need not be described in any detail.

The bushing 25 is a threadless component which is simply pushed into the associated housing bore 2 from the external face 23. At its outside face the bushing 25 has a groove or slot 29 for receiving a screw driver for rotating the bush 25 in order to adjust the relative positions of the members 9, 10. At the innermost end, the bushing 25 is releasably connected in a rotationally locked manner to the member 10. This can be effected by means of a push-in connection as shown in FIG. 5, where peg like projections 30 are arranged at the internal end of the bushing 25 so that when the bushing 25 is pushed into the bore 2 these projections 30 engage within corresponding recesses or indentations 31 at the outer end of the valve member 10 so as to produce the rotationally locked connection between the bushing 25 and the valve member 10. The bushing 25 and the associated valve insert 2 are secured into the associated bore 3 by means of a further O-ring 32 which surrounds the bushing 25 and rests within an enlargement of the bore 2 in the housing 1. A closure ring 33 is pushed into the enlarged bore section to keep the O-ring 32 under tension so that the bushing 25 is held in the bore 2 by friction. The closure ring 33 is naturally a close fit within the enlarged bore section.

It is advisable to fix the innermost member 9 of each valve assembly on the side of the housing 4 against rotation within the bore 2. This can be achieved by means of another rotationally locked push-in connection in the manner of a tongue and groove joint or the like. In this case the valve member 9 has a slot 34 at its internal end face which receives an axial projection such as a pin (not shown) which fits into the recess to secure the member 9 against rotation within the bore 2. When the valve insert or cartridge 3 is introduced into the bore 2 the pin is pushed into the recess 34 automatically to produce the rotationally-locked connection. The housing part 4 also acts as an axial stop for the valve inserts 3 when these are engaged in the bores 2.

It is notable that the valve cartridges 3 can be pushed into the housing bores 2 or removed from the housing 1 from the side of the housing 1 remote from the levers 5 and the member 10 can be rotated relative to the fixed member 9 to adjust the axial spacing between the seatings 11, 12 from the same side by means of the bushing 25. The entire device is composed of only a comparatively few simple components which can be manufactured with low cost and also has small dimensions.

The switching of the pilot valves can also be regulated by adjusting the grub screws 8 on the associated levers 5. The switching displacement is generally only very small, for example, 0.1 mm or less.

The valve device is shown only schematically in the drawings and such a small displacement cannot be represented even on the somewhat larger scale adopted in FIG. 4 where it appears that both the valves 15' 11, 16' 12 are closed. It is however to be understood that when one of the valve elements 15, 16 of each cartridge 3 is sealably engaged with its seating 11, 12, and this valve is thus closed, the other of the valve elements 16, 15 of the cartridge 3 is not engaged with its seating 12, 11 and this valve is thus opened and vice versa.

The levers 5 and therefore the associated pilot valves can be easily brought into a zero setting position by means of the adjusting screws 8 and the adjusting screws 8 can be secured, for example, by adhesive in the properly adjusted position. Once the screws 8 have been set any further adjustment can be achieved by rotating or partly rotating the member 10 relative to the fixed member 9 with the aid of the bushings 25 as described.

It is also advantageous that each valve cartridge 3 does not have to be screwed into the bore 2 but is designed as a push-in cartridge and all the component parts may be easily reached from the side of the device where the connections with the hydraulic circuits are made.

We claim:

1. In a valve device for use in a control system for a mineral mining installation; said device comprising a housing, at least one bore within the housing containing a valve assembly having two valve closure elements which engage on valve seatings to form separate valves, passage means within the housing for establishing hydraulic connection with the valves and an electromagnetically operated actuator for displacing the valve closure elements so that one valve opens whilst the other valve closes; the improvement comprising the assembly has a cartridge composed of two co-axial members disposed along said bore, each member defining one of the valve seatings, said members being in screw-threaded engagement, and adjustment means is provided for adjusting the position of the valve seatings by effecting relative rotation between the members, said adjustment means being accessible from an exterior face of the housing remote from the actuator.

2. A device according to claim 1 wherein the cartridge is insertable into and removable from the bore via said exterior face and sealing means serves to seal the cartridge with respect to the bore.

3. A device according to claim 2, wherein one of the members of the cartridge has an external screw-thread and the other of the members of the cartridge has an internal screw-thread engageable with the external screw-thread and the members have stepped through bores which receive and guide the valve closure elements and a coupling rod disposed between the closure members to cause the closure members to be displaced together.

4. A device according to claim 3, wherein each closure element is in the form of a cylindrical component with a frusto-conical end region engageable with its associated seating to provide one of the valves.

5. A device according to claim 3, wherein seals are provided between the exteriors of the members of the cartridge and the bore receiving said members.

6. A device according to claim 1, wherein the adjustment means is a rotatable component accessible from the exterior face of the housing and the rotatable component and one of the members of the cartridge are provided with interengageable means for rotatably interconnecting the component and the said one member.

7. A device according to claim 6, wherein the rotatable component is a bushing engageable in the bore in the housing.

8. A device according to claim 7 wherein the bushing also accommodates a spring which acts on one of the valve closure members.

9. A device according to claim 7 wherein the bushing is provided with means for receiving an implement for rotating the bushing and said one component.

10. A device according to claim 7, wherein the bushing is engageable as a push fit in the bore.

11. A device according to claim 7 wherein the bushing is provided with an O-ring which fits in the bore and a closure ring is releasably fitted in the bore to engage on the O-ring.

12. A device according to claim 6 wherein the other member and the housing are provided with connection means for rotatably locking the other member in the bore whilst permitting axial displacement.

13. A device according to claim 12 wherein the connection means is a tongue and groove joint.

14. A device according to claim 12, wherein the housing is composed of a first sub-housing having the exterior face and said at least one bore and there is provided another sub-housing detachably secured to the first sub-housing and having a cavity containing the actuator and wherein said connection means is provided between the other sub-housing and the other member.

15. A device according to claim 1 wherein the bore is of uniform diameter except for a region at said exterior face.

16. A device according to claim 1 wherein there are two parallel bores each containing one of the said valve assemblies.

17. A device according to claim 1 wherein the passage means has opening ports at said one exterior face.

18. A device according to claim 1 wherein the housing is composed of a first sub-housing having the exterior face and said at least one bore and there is provided another sub-housing detachably secured to the first sub-housing and having a cavity containing the actuator.

19. A device according to claim 18 wherein a sealed recess is provided between the first and other sub-housings and the recess is connected to part of the passage means leading to a hydraulic return line.

20. A device according to claim 1 wherein the actuator takes the form of a pivotable lever which carries an adjustment screw which acts through a tappet on the valve closure element remote from the exterior face.

* * * * *